United States Patent Office 2,969,381
Patented Jan. 24, 1961

2,969,381

PREPARATION OF ORGANO GROUP II-B METAL COMPOUNDS

Sidney M. Blitzer and Tillmon H. Pearson, Baton Rouge, La., assignors to Ethyl Corporation, New York, N.Y., a corporation of Delaware Filed May 1, 1959, Ser. No. 810,235

9 Claims. (Cl. 260—429.9)

The present invention is concerned with a process for the preparation of organometallic compounds, particularly the organo group II-B metal compounds.

Numerous methods have been described in the literature for the preparation of the organo group II-B metal compounds. Such procedures have, however, been employed in a very limited sense and only for laboratory used. The most prevalent procedures so employed include the reaction of a group II-B metal halide with the Grignard reagent or the reaction of the Group II-B metal, or an alloy thereof with an alkyl halide. Among the inherent disadvantages of these procedures which have limited their usage to laboratory purposes is that in the Grignard reaction, the yields obtained are moderate and the process inherently requires ether solutions. The reaction of the metal, or alloys thereof, likewise is disadvantageous because of the slowness of the reactions, the low yields obtained, and the necessity of handling the more hazardous alkyl halide materials. Likewise, this process suffers the disadvantage of producing alkyl metal halides as by-products in considerable amount unless strict control is employed.

The group II-B organometallic compounds have been primarily useful as intermediates in the formation of other organometallic compounds. For example, diethylzinc has long been used in the laboratory for reacting with lead halides to produce tetraethyllead. The reaction of diethylmercury with sodium metal is a laboratory procedure for producing ethylsodium. While there are other more limited uses for the organo group II-B metal compounds presently known, it is desirable to provide these materials by more efficient processes in order to facilitate their use in the above reactions and promote more wide spread uses of these valuable chemical tools.

Accordingly, an object of this invention is to provide a new and novel process for the preparation of the organo group II-B metal compounds. Another object is to provide the organo group II-B metal compounds in higher yield and purity than heretofore available. A still further object is to provide a more economical and simplified procedure for the production of the organo Group II-B metal compounds. These and other objects of the invention will be apparent as the discussion proceeds.

It has now been found that the organo Group II-B metal compounds can be prepared in higher yield and purity by reacting a Group II-B metal salt of an organic acid with an organometallic compound of a Group III-A element. Of the Group II-B salts of organic acids, those of mercury and zinc of the lower alkanoic acids are preferred, especially mercuric acetate. Likewise, it has been found that the lower trialkyl compounds of boron and aluminum, particularly triethylaluminum and boron, produce best results. Although the temperature of the reaction is subject to considerable latitude, it is preferable to perform the reaction at between about 25 to 150° C. As will be brought forth in more detail hereinafter, some advantage is further obtained when conducting the reaction in the presence of diluents. Thus, a preferred embodiment of this invention comprises the reaction of a zinc or mercury, preferably the latter, salt of a lower alkanoic acid with a lower trialkayl-aluminum or boron compound, preferably the former, at a temperature between about 25 to 150° C. in the presence of a diluent.

The process of this invention is of particular advantage in that higher yields and purity of the desired Group II-B compounds are obtained in comparatively short reaction periods. Another advantage of the process is that generally a completely homogenous reaction system is obtained with the insoluble constituents being by-products. Likewise, the product of the reaction is readily recoverable by simple distillation or the product can be used as obtained in the reaction mixture. Other advantages of the process will be evident as the discussion proceeds.

In general, any group II-B metal salt of an organic acid is applicable in the process. While organic acids are generally considered as having carboxylic groupings, it is also recognized that certain organic compounds not having such acid groupings but having strongly acidic hydrogen are organic acids, for example, the alcohols and phenols. Thus, the salts of organic acids employable in the process can be characterized as group II-B metal compounds wherein the metal is attached to at least one carbon-containing organic radical through an intermediate atom of oxygen or sulfur. For practical reasons, the hydrocarbon portions of such acids will generally contain not more than about 25 carbon atoms, even though higher molecular weight materials can be employed. Illustrative examples of the group II-B metal salts of organic acids include mercuric and mercurous formate, mercuric acetate, zinc acetate, mercuric propanoate, cadmium propanoate, mercuric butanoate, mercuric octanoate, zinc octanoate, mercurous myristate, cadmium octadecanoate, mercuric linoleoate, zinc linoleoate, mercuric octadecanoate, cercuric butyrate, cadmium butyrate, mercuric ethylate, zinc ethylate, mercuric phenolate, cadmium phenolate, mercuric benzoate, mercuric thiophenolate, mercuric naphthenate, zinc naphthenate, mercuric thioacetate, mercuric isobutyrate, cadmium isobutyrate, mercuric propiolate, and the like. It is to be understood that the hydrocarbon portions of such acid salts can be further substituted to result in branched chain isomers or substituted with functional groups provided such are essentially inert in the reaction. The saturated and aromatic organic acid salts are more advantageous than the salts of unsaturated non-aromatic organic acids. The salts of the lower alkanoic acids, especially those having up to about 8 carbon atoms in the hydrocarbon portions, are preferred because of their greater availability, economy, and the higher yields obtained. Such salts of the metals mercury and zinc, especially mercury, are likewise particularly preferred since highest yields are obtained and greater economy is effected.

In general, the organometallic compound of the group III-A element is a compound which has at least one organic radical bonded to a group III-A element through a carbon atom. The remaining valences of the element are generally satisfied by organic radicals or a functional group which is essentially non-reactive in the system, such as halides, hydrogen, alcoholate, and the like functions or an alkali or alkaline earth metal, the latter forming bimetallic organometallic compounds. The group III-A elements include boron, aluminum, gallium, indium, and thallium. Within this description is included all the bimetallic organometallic compounds of this group of elements wherein the other metal is generally an alkali or alkaline earth metal. Thus, typical examples of the organo group III-A element compound include trimethylaluminum, triethylaluminum, triethylborane, methyldiethylaluminum, tripropylaluminum, dimethylhexylaluminum, trioctylaluminum, trioctylborane, diethyldiboranе, diethylaluminum hydride, triisobutylaluminum, ethylaluminum sesquichloride, ethylaluminum sulfate, trivinylborane, tri-1-hexeylborane, tri-1-hexynylaluminum, trioctadecylaluminum, tricyclohexylaluminum, tricyclopentylaluminum, triphenylaluminum, triphenylborane, tribenzylaluminum, trinaphthylaluminum, tricyclohexenylaluminum, sodium tetraethylaluminum, sodium, tetraethylboron, lithium tetraethylaluminum, lithium tetraphenylboron, calcium bis-tetraethylboron, sodium tetracylohexylboron, and the like compounds wherein gallium, indium, or thallium are substituted for boron or aluminum and other alkali and alkaline earth metals are substituted for lithium, sodium, and calcium in the bimetallic organometallic compounds. In general, the hydrocarbon portions of such materials will contain up to about 30 carbon atoms and higher. It is to be understood that the hydrocarbon portions can be further substituted to result in branched chain isomers or substituted with functional groups which are essentially inert in the reaction. The preferred organometallic compounds are those of the elements boron and aluminum wherein all the valences are satisfied by lower alkyl radicals, i.e. having up to about 8 carbon atoms. This is also true when the organometallic group III-A element compound is a bimetallic organometallic compound, e.g. sodium tetraethylboron. The lower trialkylboranes and aluminum compounds, especially the latter, are preferred since higher yields are obtained with such reactants. A particularly preferred group of reactants comprises triethylborane, triethylaluminum, sodium tetraethylboron, and sodium tetraethylaluminum.

Some advantage is achieved when the reaction is conducted in the further presence of a liquid diluent. Such diluents are preferably essentially inert in the reaction with exception that those that will complex with the reactants can be employed since they will not hinder the desired result. Further criteria of such solvents are that they be liquid under the reaction conditions and preferably readily recoverable from the reaction system. Among the solvents which can be employed are included, for example, the hydrocarbons, ethers and amines, preferably tertiary amines. Among the hydrocarbons which can be employed are included the various alkanes, alkenes, cyclanes, cyclenes and aromatic compounds, including the mononuclear aromatic compounds, polynuclear non-fused ring and polynuclear fused ring aromatic compounds. Typical examples of the alkanes which are employed include heptane, octane, nonane, up to and including about octadecane and the like, and their various branched chain isomers. Among the alkenes are included, for example, heptylene, octylene, and the like, up to and including about octadecylene and their various branched chain isomers. When the cyclanes are employed as diluents, they can be, for example, cycloheptane, cyclooctane, methylcyclohexane, dimethylcyclohexane, isopropylcyclopentane, and the like. Typical examples of the cyclenes include cycloheptene, cyclooctene, 1-isopropylcyclopentene-1, 1-methylcyclohexene-1, and the like. Similarly, various polycyclanes and cyclenes are employed as, for example, cyclopentylcyclopentane; (2-methylcyclopentyl)-cyclohexane; cyclohexylcyclohexane; decahydronaphthalene; 1,1'-dicyclopentenyl; 2,2'-dicyclohexenyl; 0,4,4-bicyclodecene-1; decahydrofluorene; and the like. Typical examples of mononuclear aromatic compounds include toluene, ethylbenzene, the xylenes, 1,2-diethylbenzene, cyclopropylbenzene, the cymenes, and the like. When the diluents are polynuclear non-fused aromatic compounds, they can be, for example, 1-methyl-2-phenylbenzene; 1,3-diphenylpropane; 1-phenyl-2-p-tolylethane; 1,1-diphenylheptane; and the like. When polynuclear fused ring aromatic compounds are employed they can be, for example, indane; 1-methylindane; indene; tetralin; 1,2-dihydronaphthalene; 1-methylnaphthalene; and like. When a hydrocarbon is employed as a diluent, it is preferably a saturated or aromatic hydrocarbon. Generally speaking, the ethers can be non-aromatic, aromatic, and polyethers. The non-aromatic ethers include the monoaliphatic and mixed ethers. Typical examples of the monoaliphatic ethers which are employed are di-n-butyl ether; di-sec-butyl ether; diisobutyl ether; di-n-amyl ether; di-n-heptyl ether; and the like saturated and unsaturated ethers. Examples of the mixed ethers which are employed are n-amylmethyl ether; tert-amylethyl ether; n-butylisopropyl ether; ethylisoamyl ether; n-butyl-n-propyl ether; and the like. The aromatic ethers include, for example, the mono aromatic ethers, alkyl aryl ethers, and the alkaryl alkyl ethers. Typical examples of the mono aromatic ethers include dibenzyl ether; diphenyl ether; and the like. When the aromatic ether is an alkyl aryl ether, one can employ, for example, methylphenyl ether; methyl-o, m, or p-tolyl ether; methyl-α-naphthyl ether; ethylphenyl ether; ethyl-o,m, or p-tolyl ether; ethyl-α-naphthyl ether; phenyl-n-propyl ether; isopropylphenyl ether; n-butylphenyl ether; n-butyl-o-tolyl ether; isoamyl-n-naphthyl ether; and the like. The alkaryl alkyl ethers which are employed can be, for example, benzylmethyl ether; benzylethyl ether; benzyl-n-butyl ether; and the like. Examples of the polyethers which are employed are those having the configuration R—O—(CH$_2$)$_n$—O—R wherein R is an organic radical, preferably hydrocarbon or ether radicals, and $n$ is a small whole number as between about 1 to 10, preferably 1 to 3 inclusive. For example, such polyethers include ethylene glycol ethyl methyl ether; the diethyl ether of ethylene glycol; methyl-n-propyl ether of ethylene glycol; 1,4-dioxane; tetraethylene glycol dimethyl ether; glycerol trimethyl ether; dimethyl ether of diethylene glycol; dimethoxyethane, diethyl ether of diethylene glycol; and the like. Other polyethers which can be employed include, for example, pyrocatechol dimethyl ether; resorcinol dimethyl ether; 1,2,4-trimethoxybenzene, and the like. Included among the amines are the primary, secondary, tertiary and heterocyclic amines as, for example, ethyl amine, propyl amine, diethyl amine, dipropyl amine, dicyclohexyl amine, diphenyl amine, triphenyl amine, triethyl amine, myristyl diethyl amine, pyridine, cyclohexylamine, ethanolamine, aniline, tribenzyl amine, trivinyl amine, and the like. The tertiary amines are more advantageous when amines are used because of their lesser reactivity. In general the hydrocarbon portions of such diluents will have up to about 20 carbon atoms. Such solvents can, of course, contain other substituents which are essentially non-reactive in the system and will not hinder the principle reaction desired. The ethers comprise especially preferred reaction media, particularly the saturated polyethers, especially when a mercury salt is employed, since higher yields are obtained. Of the ethers the dialkyl ethers of ethylene and diethylene glycol wherein the alkyl groups contain up to about 6 carbon atoms are particularly preferred. Among such ethers the dimethyl ether of diethylene glycol and the dimethyl ether of ethylene glycol are particularly advantageous. When a cadmium or zinc salt is employed higher boiling, e.g. white oils boiling above about 100° C., saturated or aromatic hydrocarbons are particularly advantageous.

The proportions of the reactants can be varied over a considerable range to still result in the desired group II-B organometallic compounds. However, it is preferable to employ at least the stoichiometric amount of the organo group III-A element compound. Advantage is achieved in higher yields and faster reactions when a molar excess between about 5 to 15 percent of the organo group III-A element compound is employed. In determining the stoichiometry one can base it upon the consumption of one or all of the organo groups attached to the group III-A element via carbon. Since faster reaction is obtained of the first organo group, a particular embodiment of the invention comprises employing the above stoichiometric portions based upon reaction of only one of the organo groups per molecule of the organo group III–A compound. This is not to infer, however, that not more than one of the organo groups is reacted. The proportions of the organic solvent when employed can be varied over a wide range also. For example, between about 0.5 to 10 parts and higher by weight of the solvent per part by weight of the organo group III–A compound can be employed. In a preferred embodiment between about 1 to 10 parts by weight of the solvent per part by weight of the organo group III–A compound are employed.

The process of this invention will be more fully understood from a consideration of the following examples wherein all parts are by weight.

Example I

To a reactor equipped with internal agitation, external heating means, and a means for maintaining an inert atmosphere, was added 3.9 parts of triethylborane, 70 parts of 1,2-dimethoxyethane (dimethyl ether of ethylene glycol) and 6.4 parts of mercuric acetate. The mixture was then heated to the reflux temperature maintaining continuous agitation and refluxed for two hours. At the end of this period, 5 parts of sodium hydroxide in 15 parts of water were added to the mixture to effect separation. A heavy liquid dropped to the bottom of the reactor which was withdrawn and distilled. The amount of product so obatined was 3.4 parts representing a yield of 66 percent of diethylmercury.

Example II

Employing the reactor of Example I, 31.9 parts of mercuric acetate was added thereto along with 40 parts of dimethoxyethane. The mixture was agitated and heated to the reflux temperature. Then 8.3 parts of triethylaluminum dissolved in 40 parts of dimethoxyethane was added in a manner to control the continued reflux of the mixture after the removal of the external heating. The mixture was then refluxed for two hours and after cooling, it was extracted with 5 percent sodium hydroxide solution forming two phases. The lower phase was removed and washed with water removing the soluble ether. After separation of the upper water phase, 22.96 parts of diethylmercury were obtained. This corresponds to a yield of 88.9 percent.

Example III

Example II was repeated substituting toluene for the dimethoxyethane and at the completion of the addition of the triethylaluminum, the mixture was refluxed for one hour. In this manner, diethylmercury was obtained in high yield.

Example IV

Employing the reactor of Example I, 17 parts of cadmium diacetate were added to 16.4 parts of triethylaluminum in 45 parts of Nujol (a high boiling, white oil free of unsaturates) at room temperature. A vigorous reaction immediately took place distilling the product directly from the reaction mixture which was collected. In this run, 7.84 parts of diethylcadmium were obtained representing a yield of 62.7 percent.

Example V

Employing the procedure of Example IV, 13½ parts of zinc acetate were reacted with 16.4 parts of triethylaluminum in 45 parts of Nujol. Again a vigorous reaction took place which was essentially instantaneous. Upon cooling the reaction mixture and subjecting it to distillation at 50 to 105° C., reducing the pressure from 46 to 15 mm. of mercury, 6.85 parts of diethylzinc were obtained representing a yield of 75.3 percent.

Example VI

When 193 parts of mercuric phenolate are reacted with 195 parts of trioctylborane in 350 parts of dimethyl ether of diethylene glycol at 100° C. for two hours, dioctylmercury is obtained in high yield.

Example VII

Employing the procedure of Example II, 97.4 parts of mercuric octanoate are reacted with 41.4 parts of trivinylborane in the presence of 181 parts of triethylamine at 50° C. for 4 hours. Divinylmercury is obtained.

Example VIII

When triphenylaluminum is reacted with mercuric benzoate in diethyl ether at the reflux temperature, diphenylmercury is produced.

Example IX

Dicyclohexylmercury is obtained in essentially quantitative yield when tricyclohexylaluminum is reacted with mercuric ethylate in pyridine at 100° C. for 2 hours.

Example X

Employing the procedure of Example I, tri-1-hexynylaluminum is reacted with zinc naphthenate at 0° C. in mixed hexanes for 6 hours. Di-1-hexynylzinc is obtained.

Example XI

When mercuric propanoate is reacted with ethylaluminum sesquichloride (a mixture of diethylaluminum chloride and ethylaluminum dichloride) for 2 hours in the methylethyl ether of ethylene glycol at 100° C. diethylmercury is readily recovered from the reaction system by dilution with dilute sodium hydroxide solution and gravity separation.

Example XII

When 31.9 parts of mercuric acetate are reacted with 32 parts of sodium tetraethylboron in the presence of 105 parts of tetrahydrofuran at reflux for 2 hours, diethylmercury is obtained.

Example XIII

When an equivalent quantity of sodium tetraethylaluminum is substituted for the sodium tetraethylboron in the above example and benzene is employed as the diluent, diethylmercury is obtained in high yield.

Example XIV

Diphenylmercury is produced when lithium tetraphenylboron is reacted with mercuric acetate in diethyl ether at the reflux temperature for 3 hours.

The above examples are presented by way of illustration and it is not intended to be limited thereby. It will be evident that satisfactory results will be obtained when the aforementioned organo group III–A element compounds, group II–B organic acid salts, and solvents are substituted.

As evident from the above examples, the temperature at which the reaction is conducted is subjected to considerable latitude. In general, temperatures between about 0° C., up to decomposition temperature of the reactants and product, are employable. However, in order to minimize side reactions and decomposition of product, it is preferable to conduct the reaction at a temperature between about 25 to 150° C. The length of reaction time also varies, in some instances being essentially instantaneous and in others requiring longer reaction periods in order to effect completeness. Generally speaking, the reaction will be complete within about 5 hours with shorter reaction times being required as the temperature is increased as between about 75 to 150° C.

The products can be employed as obtained in the reaction mixture. If it is desired to separate the products, such can be accomplished by fractional distillation or simple distillation. In the case of the organomercury products, such will generally separate as a separate phase or separation can be promoted by the addition of aqueous hydroxide solution to the reaction mixture.

While the reaction is generally conducted at atmospheric pressure, it is to be understood that the pressure can be varied over a wide range including vacuum systems or pressures above atmospheric where applicable.

Because of the flammability of the organo group III–A element compound, the reaction is generally conducted in a closed system or in the presence of an inert atmosphere including, for example, argon, neon, krypton, Freon and the like.

Having thus described the process of this invention, it is not intended that it be limited except as set forth in the following claims.

We claim:

1. The process for producing organometallic compounds of group II–B metals which comprises reacting a Group II–B metal salt of an organic acid wherein the metal is attached to at least one carbon-containing organic radical through an intermediate atom selected from the group consisting of oxygen and sulfur with a hydrocarbon Group III–A element compound.

2. The process of claim 1 wherein the reaction is conducted at a temperature between about 25 to 150° C.

3. The process of claim 2 wherein the reaction is conducted in the presence of an ether of a polyhydric alcohol.

4. A process for the manufacture of diethylmercury which comprises reacting mercuric acetate with triethylborane at a temperature between about 25 to 150° C. in the presence of dimethoxyethane.

5. The process which comprises reacting zinc diacetate with triethylaluminum in the presence of a hydrocarbon solvent at a temperature between about 25 to 150° C.

6. The process for the manufacture of diethylmercury which comprises reacting mercuric acetate with triethylaluminum at a temperature between about 25 to 150° C. in the presence of dimethoxyethane.

7. The process for the manufacture of diethyl-cadmium which comprises reacting cadmium diacetate with triethyl-aluminum at a temperature of about 25 to 150° C. in the presence of a hydrocarbon solvent.

8. The process of claim 2 further characterized in that at least the stoichiometric amount of said hydrocarbon Group III–A compound is employed.

9. The process of claim 2 further characterized in that said Group II–B metal salt is a salt of a lower alkanoic acid and said hydrocarbon Group III–A compound is a lower trialkylaluminum compound.

References Cited in the file of this patent

FOREIGN PATENTS 768,765   Great Britain _____ Feb. 20, 1957